United States Patent [19]

Weimar

[11] Patent Number: 4,813,184
[45] Date of Patent: Mar. 21, 1989

[54] SEALING ARRANGEMENTS

[75] Inventor: Erich Weimar, Viersen, Fed. Rep. of Germany

[73] Assignee: Draftex Industries Limited, Edinburgh, Scotland

[21] Appl. No.: 123,923

[22] Filed: Nov. 23, 1987

[30] Foreign Application Priority Data

Nov. 25, 1986 [GB] United Kingdom ............... 8628130

[51] Int. Cl.$^4$ ............................................. E06B 7/16
[52] U.S. Cl. ........................................ 49/477; 49/498
[58] Field of Search ........................... 49/477, 497, 498

[56] References Cited

U.S. PATENT DOCUMENTS

| 2,699,580 | 1/1955 | Smith | 49/477 |
| 3,442,048 | 5/1969 | Elias | 49/477 X |
| 3,449,864 | 6/1969 | Prost-Dame et al. | 49/477 X |
| 3,849,092 | 11/1974 | Bakke et al. | 49/477 X |
| 4,114,901 | 9/1978 | Pot | 49/477 X |
| 4,250,941 | 2/1981 | McNally | 49/477 X |
| 4,371,175 | 2/1983 | Van Dyk, Jr. | 49/477 X |
| 4,381,115 | 4/1983 | Ko | 49/498 X |
| 4,411,941 | 10/1983 | Azzola | 49/498 X |
| 4,538,380 | 9/1985 | Colliander | 49/497 X |

FOREIGN PATENT DOCUMENTS

| 744536 | 2/1956 | United Kingdom . |
| 758388 | 10/1956 | United Kingdom ............... 49/477 |
| 905808 | 9/1962 | United Kingdom . |
| 1189002 | 4/1970 | United Kingdom . |
| 1493624 | 11/1977 | United Kingdom . |
| 2067637 | 7/1981 | United Kingdom ............... 49/477 |

Primary Examiner—Kenneth J. Dorner
Assistant Examiner—James R. Brittan
Attorney, Agent, or Firm—Leydig, Voit & Mayer

[57] ABSTRACT

A vehicle door seal with a channel shaped gripping part is mounted on a bodywork flange defining the door opening and this part supports a tubular sealing part such as made of plastics or rubber of cellular or foamed configuration. The air pressure within the latter can be increased or decreased by means of an air pump connected to a tubular extension. When the door is opened, the air within the sealing part is evacuated and the sealing part collapses to permit easy closing of the door. When the door is closed, the air pressure within the tubular part is increased so as to inflate the sealing part towards its circular configuration and to bring it into sealing engagement with the closed door. The interior of the sealing part is lined with an air-impervious lining and this and the interior of the part are formed with grooves which are so configured that the collapsed sealing part has a neat appearance.

4 Claims, 1 Drawing Sheet

SEALING ARRANGEMENTS

BACKGROUND OF THE INVENTION

The invention relates to sealing arrangements. Embodiments of the invention to be described may be used in vehicle body construction such as for sealing around closable openings, for example door openings.

BRIEF SUMMARY OF THE INVENTION

According to the invention, there is provided a sealing arrangement for sealing around a closable opening, having a sealing part made of flexible material defining a longitudinal hollow interior, and means connecting to the hollow interior to enable the pressure therewithin to be increased or decreased so as to cause the sealing part to assume a relatively expanded sealing configuration or a relatively collapsed non-sealing configuration, the sealing part being constructed and adapted so that the collapsed configuration is of predetermined form.

According to the invention, there is also provided a door seal for sealing around a vehicle door opening, comprising a channel-shaped gripping part for embracingly gripping a mounting flange or the like around the periphery of the door opening, a hollow tubular sealing part mounted on an outside wall of the gripping part so as to face the door of the opening as it closes, means for varying the air pressure within the hollow interior of the sealing part whereby when the air pressure is substantially reduced the sealing part partially collapses and provides clearance for easy closure of the door and when the air pressure is thereafter increased the tubular part is inflated and thereby expanded into sealing engagement with the closed door, and means defining one or more grooves running longitudinally along the interior wall of the sealing part so as to define a predetermined configuration into which the sealing part collapses.

According to the invention, there is further provided a door seal for sealing around a vehicle door opening, comprising a channel-shaped gripping part for embracingly gripping a mounting flange or the like around the periphery of the door opening, a hollow tubular sealing part mounted on an outside wall of the gripping part so as to face the door of the opening as it closes, means for varying the air pressure within the hollow interior of the tubular sealing part whereby when the air pressure is substantially reduced the sealing part partially collapses and provides clearance for easy closure of the door and when the air pressure is thereafter increased the tubular part is inflated and thereby expanded into sealing engagement with the closed door, and an air-impervious lining formed on the interior of the hollow sealing part.

DESCRIPTION OF THE DRAWINGS

Vehicle body door sealing arrangements embodying the invention will now be described, by way of example only, with reference to the accompanying diagrammatic drawings in which.

DESCRIPTION OF PREFERRED EMBODIMENTS

Figure 1:
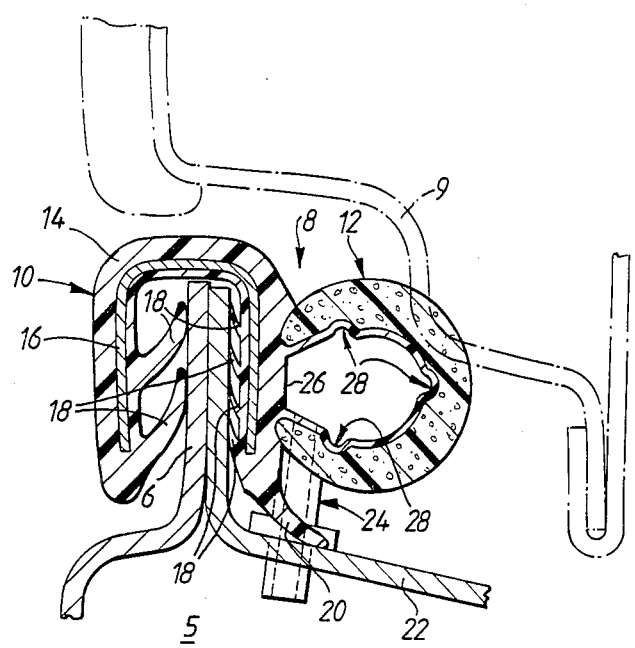
FIG. 1 shows one of the sealing arrangements in cross-section and in a sealing configuration.

As shown in FIG. 1, the vehicle body indicated generally at 5 terminates around the door opening in a flanged joint 6, the plane of this joint being generally parallel and aligned with the plane of the door opening. The sealing arrangement indicated generally at 8 is mounted on the flanged joint 6. The vehicle door is shown dotted at 9, this being the position that it assumes when closed. The sealing arrangement 8 comprises a gripping part 10 and a sealing part 12.

The gripping part 10 is of longitudinal channel form running more or less completely around the door opening. It is preferably made of extruded plastics or rubber material 14 in which is embedded a core or carrier 16. The carrier is preferably made of metal and may take any convenient form. For example, it may be in the form of side-by-side inverted U-shaped elements which are either connected together by short interconnecting links or are completely disconnected. Instead, however, it could be made of wire looped to and fro. Other forms of carrier are possible. The material 14 may be extruded over the carrier 16 by means of a known cross-head extruder.

The plastics or rubber material 14 also defines integral gripping lips 18 which make contact with the sides of the flanged joint 6 and, in conjunction with the resilience of the carrier 16, help to hold the gripping section 10 securely in position on the flanged joint 6. The lips 18 also provide sealing against ingress of draughts and water which might otherwise run around the flanged joint 6, inside the channel of the gripping part.

The gripping part also defines an integral lip 20 which engages part of the vehicle bodywork 22 and provides additional sealing.

The sealing part 12 is in this example generally hollow and tubular. It is preferably made of rubber or plastics material and of foamed or cellular configuration. It may be manufactured separately (by extrusion) and then secured to the outside wall of the gripping part 10 by means of adhesive. Instead, however, it may be integrally extruded with the material 14 of the gripping part 10. Known forms of dual extrusion may be used in such a case so as to ensure that the extruded material has appropriate configurations for the different parts: for example, cellular or foamed configuration for the gripping part 12 and solid configuration for the gripping part 10 (and with different degrees of hardness if desired).

At at least one point around the periphery of the door opening, a tubular extension 24 is mounted on the vehicle body part 22 and passes through the side wall of the tubular sealing part 12 to make connection with its interior. The other end of the tubular extension 24 passes through the vehicle body part 22. This end is connected as by means of a flexible tubular connection not shown to an air pump. By means of this air pump, the air pressure within, and thus the configuration of, the sealing part 12 can be varied.

FIG. 1 shows its configuration in its operative or sealing condition. In this configuration, the air pump supplies air pressure to the interior of the sealing part 12 and it thus assumes or tends to assume its approximately circular cross-sectional shape.

Figure 2:
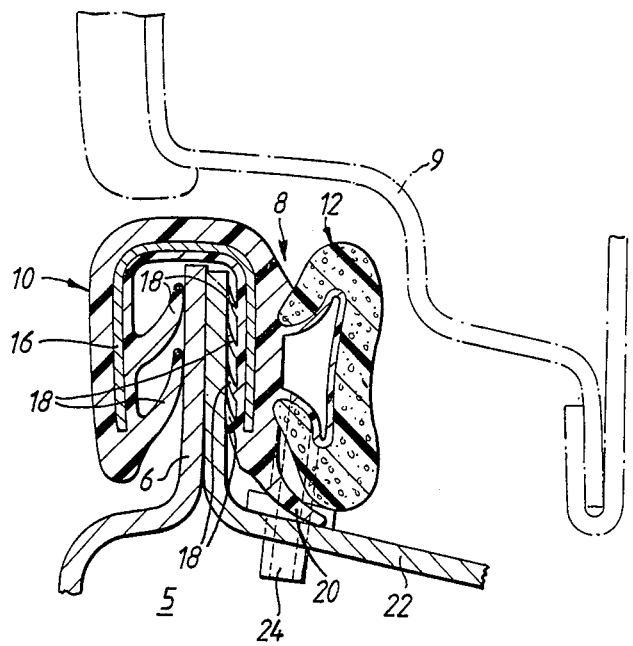
FIG. 2 corresponds to FIG. 1 but shows the door sealing arrangement in a non-sealing configuration.

FIG. 2, in which parts corresponding to FIG. 1 are similarly numbered, shows the sealing part 12 in its collapsed or non-sealing configuration which is achieved by substantially evacuating the air from the interior of the sealing part by means of the air pump. As shown, the sealing part 12 collapses on itself.

Normally, when the vehicle door 9 is open, the sealing part 12 is held in the collapsed configuration as shown in FIG. 2 (by evacuating its interior via the air pump). This permits the door 9 to be closed very easily because the closing door makes little or no contact with the sealing part 12.

However, when the door has been closed, the air pump increases the air pressure within the sealing part 12 so as to inflate it towards the configuration shown in FIG. 1. In fact of course it will not be able to assume exactly this configuration because the expanding sealing part 12 will come into contact with the closed door 9 and will thus be distorted by such contact and will be pressed into very effective sealing engagement with the door.

In accordance with a feature of the invention, the interior of the sealing part 12 is formed with an impervious inner lining 26. This is formed during the extrusion process and is for the purpose of making the sealing part 12 substantially air-tight. This is necessary in order to enable it to be switched between it inflated and collapsed configurations by means of the air pump.

As already explained, the sealing part 12 is normally held in the collapsed configuration (FIG. 2) when the door is opened. In this situation, the sealing part is of course readily visible. In accordance with another feature the invention and in order to prevent the sealing part 12 having an unsightly appearance when collapsed, the lining 26 and the interior of the sealing part 12 are formed with longitudinal grooves 28. These, in conjunction with the general shape of the interior of the sealing part 12, ensure that the collapsing sealing part assumes a neat appearance as shown in FIG. 2 when air is evacuated by means of the air pump.

The exact positions of the longitudinal grooves 28, their shapes and the shapes of the corresponding parts of the interior of the sealing part, can all be varied as necessary to achieve the desired neat collapsed appearance.

What is claimed is:

1. A sealing arrangement for sealing around a closable opening, comprising
    a sealing part made of flexible material defining a longitudinal hollow interior and having a normal, sealing, configuration,
    means connecting to the hollow interior to enable the pressure therewithin to be decreased below atmospheric pressure so as partially to evacuate the sealing part and to cause the sealing part to assume a relatively collapsed non-sealing configuration, and to enable the pressure therewithin to be increased to cause the sealing part to re-assume the said sealing configuration,
    the interior wall of the sealing part defining the hollow interior being formed with one or more longitudinal grooves, so positioned that the collapsed configuration is of predetermined form, and
    an air-impervious lining on and extending over the whole of the interior wall of the sealing part including the said one or more grooves.

2. A sealing arrangement according to claim 1, comprising a gripping part which mounts the sealing part in the required position around the said opening, the sealing part being mounted on an outside wall of the gripping part.

3. A door seal for sealing around a vehicle door opening, comprising
    a channel-shaped gripping part for embracingly gripping a mounting flange or the like around the periphery of the door opening,
    a hollow tubular sealing part mounted on an outside wall of the gripping part so as to face the door of the opening as it closes,
    means for varying the air pressure within the hollow interior of the sealing part whereby when the air pressure is substantially reduced the sealing part is partially evacuated and partially collapses and provides clearance for easy closure of the door and when the air pressure is thereafter increased the tubular part is inflated and thereby expanded into sealing engagement with the closed door,
    means defining a plurality of grooves running longitudinally along the interior wall of the sealing part so as to define a predetermined configuration into which the sealing part collapses, and
    an air-impervious lining on and extending over the whole of the interior of the sealing part and extending into and lying within the said grooves.

4. A door seal according to claim 3, in which the hollow tubular sealing part is approximately circular in cross-section and there are three such grooves with two of them being spaced approximately diametrically opposite each other and the third one being approximately equiangularly spaced from each of the said two grooves.

* * * * *